April 19, 1949.  G. BAER  2,467,456

SAFETY CONTROL DEVICE FOR CAMERA TELEMETERS

Filed Feb. 13, 1946

Inventor
G. Baer
By Glascock Downing Seebold
Attys.

Patented Apr. 19, 1949

2,467,456

UNITED STATES PATENT OFFICE 2,467,456

SAFETY CONTROL DEVICE FOR CAMERA TELEMETERS

Georges Baer, Paudex, Lausanne, Switzerland, assignor to Pignons S. A., Ballaigues, Switzerland, a corporation of Switzerland Application February 13, 1946, Serial No. 647,387
In Switzerland March 17, 1945

3 Claims. (Cl. 95—44)

1

The subject of the present invention is a safety device for the control of the telemeter of a camera. Devices are now used by which a photographic objective is so connected with a telemeter that the movements of the objective and of the telemeter are correlated. In ordinary cameras, the device is disposed in the interior of the camera, and in those cameras having interchangeable objectives the device is protected by the camera case when the objective is removed. In special cameras, such for example cameras with movable reflex mirrors, the objective cannot penetrate deep into the case of the camera, because the space behind the objective must remain free for movement of the telemeter. It follows that the mechanism between the telemeter and the mounting of the objective, which is subject to the action of a spring urging it against the mounting, would be projected out of the case under the influence of this spring when the objective is removed. This mechanism may then be damaged, thereby rendering the telemeter useless.

The subject of the present invention is a safety mechanism which obviates this disadvantage. It is installed in a camera comprising an objective mounted in a sleeve threaded in a ring removably fastened in the camera case. The improved mechanism is located between the objective and the telemeter and comprises an operating lever urged by a spring into contact with the objective, this lever serving to transform axial movement of the objective into rotary movement of a telemeter deviating element. According to the invention, the mechanism is so designed that said lever is subjected, on the one hand, to the movements of said ring, and, on the other hand, to the action of a second spring co-acting with said lever so that, when the objective is in place, a finger renders the second spring inoperative and when the objective is removed from the camera this second spring, which is stronger than the first spring, withdraws said lever into the interior of the camera casing.

The attached drawing shows schematically and by way of example an embodiment of the invention.

Figure 1:
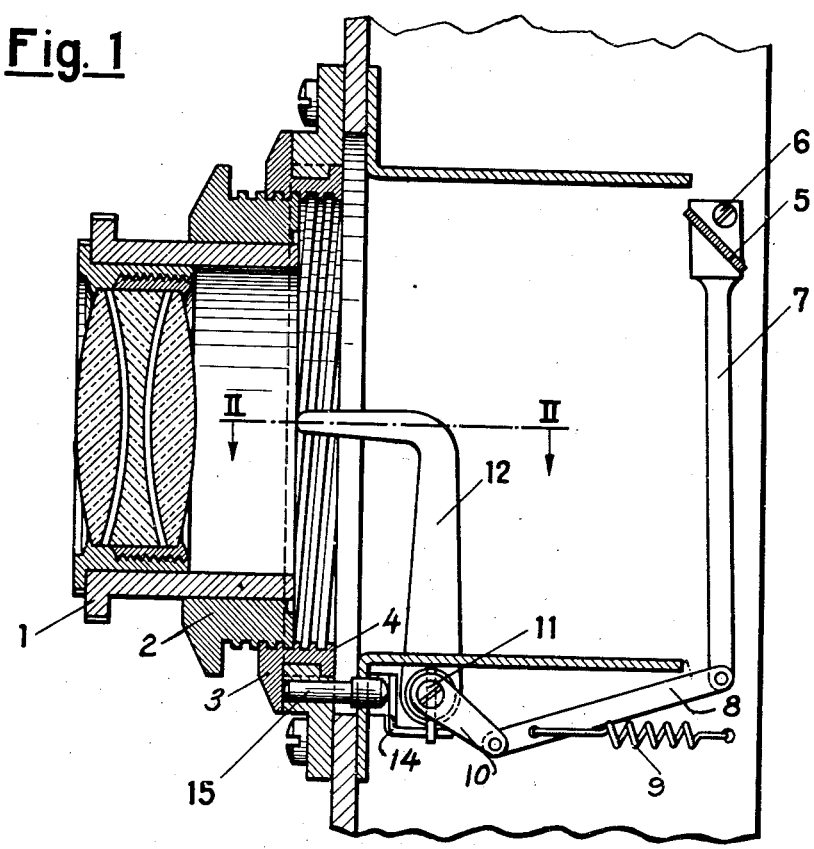
Fig. 1 is a horizontal section along the axis of the camera objective.
Figure 2:
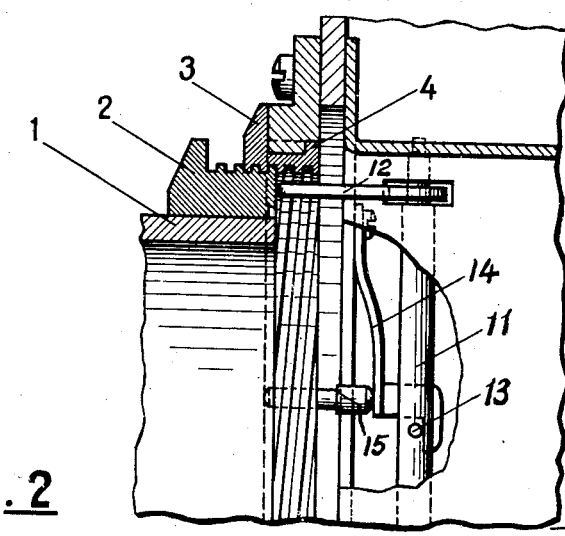
Fig. 2 is a partial section along the line II—II of Fig. 1.

In the embodiment shown, the camera is provided with an objective 1 slidable axially in a ring 2 from inoperative position to operative position which is that shown on the drawing. The ring 2 is threaded in a sleeve 3 which is secured on the case of the camera by means of a bayonet joint 4.

The telemeter comprises two mirrors, one of which is shown at 5 pivoted on a pintle 6. The angular movement of the mirror 5 is produced by a lever 7 on which the mirror 5 is rigidly mounted. A link 8 provided with a return spring 9 connects the lever 7 with a crank arm 10 mounted on one end of a shaft 11 journalled in the casing of the camera. At the other end of the shaft 11 there is mounted an L-shaped lever 12 whose outer end bears against the inner edge of the ring 2.

In its middle part the shaft 11 carries a radial pin 13 cooperating with a leaf spring 14 mounted on the casing of the camera. This spring 14 is stronger than the spring 9. The spring 14 is held inoperative by a finger 15 whose outer end bears against the inner edge of the sleeve 3.

The operation of the device is as follows:

The objective is set according to the depth of focus by turning the ring 2 in the sleeve 3. The lever 12 is rocked by the axial movement of the ring 2 and through shaft 11, crank 10, link 8 and lever 7, causes the mirror 5 to have such angular movement that the adjustment of the telemeter always exactly corresponds to the setting of the objective.

When changing the objective 1, the sleeve 3 is removed from the camera casing by unlocking the bayonet joint 4. This releases the finger 15 and frees also the spring 14, which acts on pin 13 on shaft 11 which rocks shaft 11 which retracts the lever 12 into the camera casing in opposition to the action of the return spring 9, into a position in which it is not in the way and is protected from being damaged during the operation of the change of objective 1. When this operation is completed, the sleeve 3 being locked again into position by its bayonet joint 4', the finger 15 is applied against the spring 14, and it is again the spring 9 which takes control of the telemeter.

The advantage of this device is therefore that this safety mechanism (13, 14, 15) automatically brings the control lever 12 into a position in which it is safe against any accident during the changing of objective.

What I claim is:

1. In a camera provided with an objective mounted for adjustment axially in the case of the camera, and an adjustable telemeter provided with adjusting means between the objective and the telemeter comprising a lever biased into contact with the objective, said lever being adapted to transmit the axial movements of the objective to said telemeter adjusting means, a safety device, to prevent said lever from being projected out of the case of the camera when the objective is removed from the case, comprising a control finger pressed by the objective when the objective is mounted in the case against a spring adapted to operate said adjusting means, said spring displacing the said lever toward the interior of the case when the pressure of the objective on the control finger ceases on removal of the objective from the case.

2. In a camera according to claim 1, the said telemeter adjusting means comprising a link connected, on the one hand, with a pivoting support of a deviating element for the telemeter, and, on the other hand, with a crank of a rock shaft, said shaft having mounted thereon the said lever and a radial pin biased by said spring.

3. In a camera according to claim 1, the said telemeter adjusting means comprising a link biased by a return spring and connected, on the one hand, with a pivoting support of a deviating element for the telemeter, and, on the other hand, with a crank of a rock shaft, said shaft having mounted thereon the said lever and a radial pin biased by the spring against which said control finger is pressed which is stronger than said return spring, the two springs acting in opposite directions.

GEORGES BAER.

REFERENCES CITED

The following references are of record in the file of this patent:

UNITED STATES PATENTS

| Number | Name | Date |
| --- | --- | --- |
| 2,041,632 | Barnack | May 19, 1936 |
| 2,364,413 | Wittel | Dec. 5, 1944 |

FOREIGN PATENTS

| Number | Country | Date |
| --- | --- | --- |
| 742,797 | France | Jan. 4, 1933 |